H. F. HONS, JR.

TRANSMISSION BAND.

APPLICATION FILED NOV. 3, 1921.

Reissued Jan. 17, 1922. 15,271.

*Inventor.*
*H. F. Hons Jr.*
By Acker & Folker
his Attorneys

UNITED STATES PATENT OFFICE.

HENRY FRED HONS, JR., OF SAN FRANCISCO, CALIFORNIA, ASSIGNOR TO DUPLEX TRANSMISSION-BAND, INC., A CORPORATION OF CALIFORNIA.

TRANSMISSION BAND.

15,271. Specification of Reissued Letters Patent. Reissued Jan. 17, 1922.

Original No. 1,322,111, dated November 18, 1919, Serial No. 299,146, filed May 23, 1919. Application for reissue filed November 3, 1921. Serial No. 512,679.

*To all whom it may concern:*

Be it known that I, HENRY FRED HONS, Jr., a citizen of the United States, and a resident of San Francisco, in the county of San Francisco and State of California, have invented certain new and useful Improvements in Transmission Bands, of which the following is a specification.

This invention is an improvement in brake bands and has reference more particularly to braking means used in connection with automobile transmissions.

An object of this invention is to provide a brake band that can be easily put in a car and which may be shifted up and down allowing the band to slip around within the transmission case with ease.

Another object is to provide a band for transmissions which will retain its original and normal shape and size.

Another object is to provide a band made up of removable parts.

With these and other objects which will become apparent as the disclosure proceeds, the invention consists in certain novel features of construction, arrangement and combination of parts, as will be hereinafter fully described and pointed out in the claims, reference being had to the accompanying drawing, in which—

Figure 1:
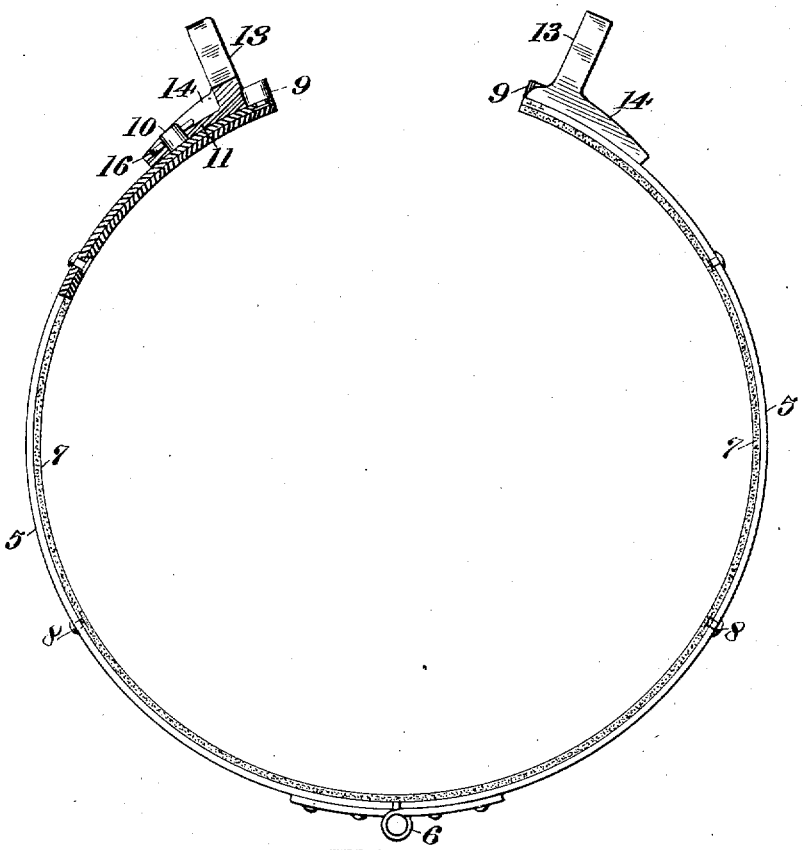
Figure 1 is an elevation, partly in section of my improved brake band.
Figure 2:
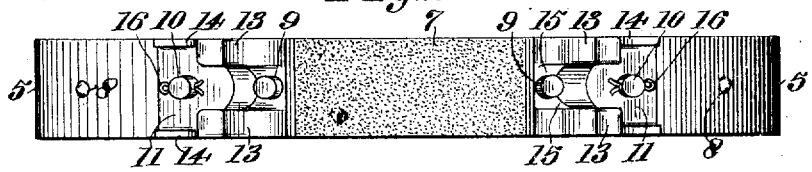
Fig. 2 is a top plan view of the same.
Figure 3:
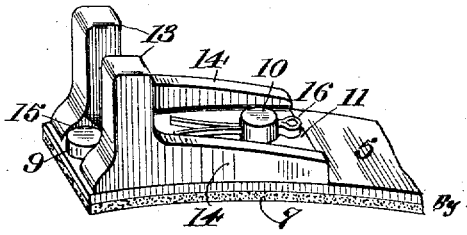
Fig. 3 is an enlarged detailed perspective view of one of the straining ears.

In devices of the character upon which the present invention is designed to improve it is usual to make the bands which are put around the drums of the transmission, as a single member or a one-piece band, and to apply these and remove them they must be bent out of shape, causing great trouble and loss of time in installing, largely due to the fact that the bands are almost a complete circle.

To overcome these objections and defects, I construct my band of two substantially semi-circular sections or members 5, of steel having more or less resiliency, the sections having a hinged connection 6 at their lower ends. The friction lining 7 is of a single length, and is secured in its proper relation to the inner face of the two-part band by the rivets 8.

At the free ends of the respective members of the band, I provide a head or guide pin 9 rigidly connected to the member or integral therewith, said pin being positioned at the lateral center of the band member and slightly back from the free end of same.

The straining pins 10 are designed to hold the straining ears in place and also from pulling forward or moving backward. These ears which are removable from the band include a base portion 11, the lower face of which is made on approximately the same arc as the band section to which it is applied and is provided with a perforation in which the pin 10 fits.

Spaced apart outstanding lugs 13 are provided at its forward end, and side walls or flanges 14 which merge into the back walls of the said lugs; the front end of the ears projecting slightly beyond the transversal plane of the lugs, and the base is provided with a notch or cutout 15, within which the head or guide pin 9 fits.

The straining pins are provided with passages just above the upper surface of the base and into these passages are forced the cotter pins 16 which hold the ears removably against the ends of the band sections; these cotter pins, in addition to performing the function just stated, are also used to prevent the ears from moving upwardly away from the band sections.

The lining 7 is of the character used with the ordinary transmissions and can be readily removed as it is held to the inner face of the band by split rivets 8.

As the band sections are preferably made of cold rolled steel, and all other parts including the ears being made of steel, the band as a unit will withstand hard usage.

The band being made in two sections hingedly connected renders it easy to put in the car transmission case, as it can be shifted up and down, allowing the band to slip around inside the transmission case with ease. No bending of the band is necessary as in single member bands such as are in common use.

Furthermore the ears can be removed with ease as there is nothing to become wedged.

Again, the band being in two sections, allows one section to be lifted away from the crank case and the other section easily started around the drum of the transmission whereas in the single section type band one end of the band hits the side of the crank case and only by bending the band away from the case can it be started in the case.

By providing the side flanges or walls 14 which extend outwardly beyond pins 10 and the cotter pins 16, they are protected against being broken by accident when in proper co-operating relation with each other.

I claim:—

1. A device as herein characterized and consisting of a pair of steel band sections hingedly connected at one end, detachable straining ears at the free ends of said sections, said ears including a base plate having a notched front end and spaced apart lugs or posts adjacent the front end, straining and holding means engaging the rear portion of said base plate, and guide pins projecting from the outer face of said sections at their free ends, and fitting within the aforesaid notches.

2. A brake band for transmissions consisting of a pair of semi-circular steel band sections hingedly connected at one end, a straining ear mounted on each section at its free end, said ears including a base plate fitting on said sections, spaced apart outstanding lugs or posts adjacent the front end of said base plate, said plate notched or cut out between said lugs, a guide pin carried by the sections and fitting within said notch, a straining pin carried by said sections and extending through the base plate intermediate its front and rear ends, and means engaging said straining pin for holding the base plates to the band sections, and against vertical movement.

3. A device for the described purpose, the same comprising a flexible brake band for automobile transmission, detachable straining ears at the free ends of said band, said ears including a base plate having a notched front end and spaced lugs or posts adjacent said end, straining and holding means engaging the rear portion of said base plate, and guide pins projecting from the outer face of the free ends of said band for holding the straining ears in place.

4. A device for the described purpose, the same comprising a flexible band for automobile transmission provided adjacent each of its free ends with a projecting guide pin, straining ears detachably mounted relative to the free ends of the band, said ears including a base plate adapted to engage the guide pin and carrying spaced outstanding lugs or posts adjacent the front end thereof, and means for detachably holding the base plates and their associated members to the free end portions of the flexible band.

5. The combination with a flexible brake band for automobile transmissions provided adjacent each free end with an outwardly projected guide pin, of straining means each comprising a base adapted to engage said pins and provided with spaced projecting side flanges or walls and upwardly projected spaced outstanding lugs at the forward end thereof, a straining pin projected from each free end portion of the flexible band for engaging with the rear end portion of the base plates, and means for detachably holding the base plates relative to said straining pins.

6. A transmission band having a straining ear detachably mounted thereon, said ear comprising a relatively short base portion constructed with upwardly projected spaced longitudinally extended side wall flanges gradually increasing in height from the rear toward its forward end, vertically extended spaced lugs or posts projected from the forward end of the base and with which merge the said side wall flanges, and means projected from the band for engaging the base plate at its front and rear ends for detachably holding the ear to the said band, and preventing longitudinal and lateral displacement thereof.

7. An automobile transmission band embodying in its construction a detachable straining ear having a base plate provided with a notched front end and upwardly projected spaced lugs adjacent said end, straining and holding means engaging the rear portion of said base plate, and a guide pin projecting from the outer face of the band end for engaging and holding the straining ear in place.

HENRY FRED HONS, Jr.